United States Patent Office 3,426,607
Patented Feb. 11, 1969

3,426,607
REMOTELY CONTROLLED VARIABLE SPEED TRANSMISSION
Ilie Chivari, Dusseldorf, Germany, assignor to Entwicklungsgesellschaft Eckerfeld KG, Langenberg, Rhineland, Germany
Filed Aug. 31, 1966, Ser. No. 576,306
Claims priority, application Germany, Sept. 3, 1965, C 36,798; Jan. 12, 1966, C 37,879
U.S. Cl. 74—330    13 Claims
Int. Cl. F16h 3/04, 3/08

ABSTRACT OF THE DISCLOSURE

A step by step change speed device has a plurality of clutches. The output half of each clutch is connected to the output shaft. A first gearing means connects the input shaft to the input half of one clutch. A second gearing means drives from the first gearing means and connects to the input half of a second clutch. A third gearing means drives from the second gearing means and connects to the input half of a third clutch. The input and output shafts are coaxial and a fourth clutch directly connects these two shafts, being also coaxial with the shafts. In one embodiment all of the clutches are coaxial with the input and output shafts. In a second embodiment the first, second and third clutches, with the respective gearing means, are mounted on auxiliary shafts spaced about the input and output shafts and parallel thereto.

---

This invention relates to a remotely controllable variable speed transmission, controllable for example by fluid under pressure, having an input shaft rotating at constant speed, and an output shaft rotating at step-by-step variable speed. Such a transmission can be used in the drive systems of all kind of machines or the like, or also for vehicle power drive systems.

An object of the invention is to provide a variable speed transmission which permits both standstill of the output shaft and convenient remotely controlled shifting within a relatively large range of speeds.

Another object of the invention is to provide a transmission of the type mentioned which is of relatively simple and space saving structure.

A further object of this invention is to provide a transmission of the type mentioned which makes multiple use of identical structural elements, in order to reduce the manufacturing costs.

A still further object of this invention is to provide a transmission of the type mentioned, which does not require close tolerances of the structural elements.

Accoring to this invention, a plurality of clutch halves are provided connected with each other and with one of the shaft through gearings of different drive ratios, the other clutch halves thereof being drivingly connected with the other shaft, and the individual clutches are selectively engageable, preferably by supply of fluid under pressure or of electric current.

The invention and additional inventive details will be described hereinbelow by way of several embodiments, reference being had to the drawings.

Figure 1:
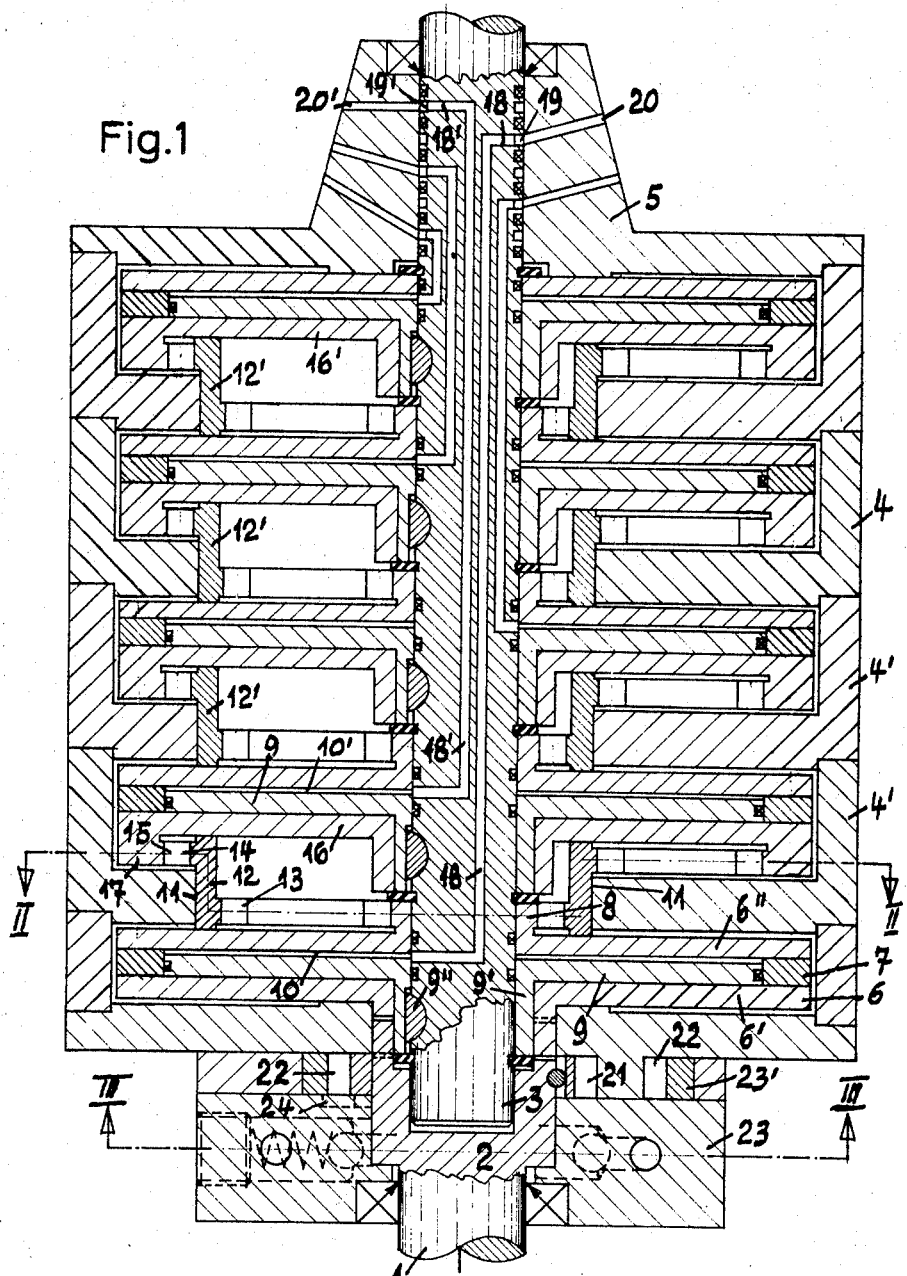
FIGURE 1 shows a longitudinal sectional view of a transmission having coaxially arranged clutches.
Figure 2:
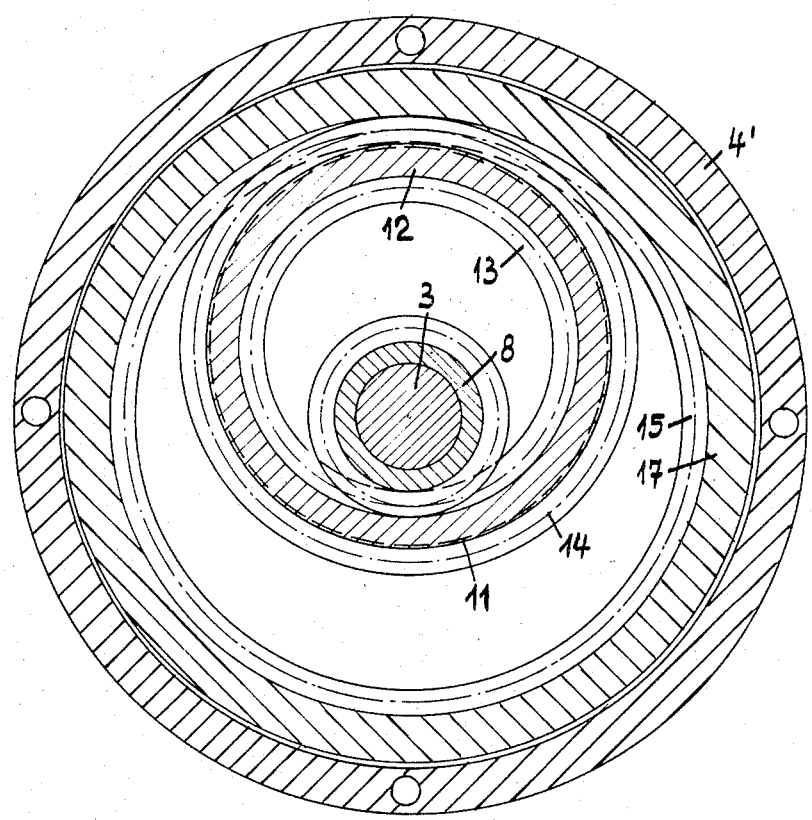
FIGURE 2 is a sectional view taken along line II—II of FIGURE 1.

A reversible electric drive motor (not shown) is connected with an input shaft 1. An output shaft 3 is mounted in an end portion 2 of the input shaft 1 and extends through a casing 4 and is again supported in a cover 5. A clutch cylinder 6 is fixed to the end portion of the input shaft 1, and is composed of two substantially disc-shaped parts 6', 6" and a spacer ring 7. Part 6' is rotatable on the output shaft 3 and has a toothed shoulder 8. A clutch disc 9 having a shoulder 9' is located between the parts 6', 6", thus inside the clutch cylinder. Disc 9 is non-rotatably connected with the output shaft 3 by a spline or key 9" but is axially movable through short distances. Part 6' of the clutch cylinder 6 is supported on the shoulder 9'. A shallow pressure chamber 10 is formed between the clutch friction disc 9 and part 6" of the clutch cylinder 6. A pressure fluid can be introduced into this chamber in a manner to be described hereinafter. Due to the pressure in the pressure chamber 10, the clutch friction disc 9 is pressed against the part 6' of the clutch cylinder 6, and is rotated thereby by friction, so that now the clutch friction disc 9 and the output shaft rotate with the clutch cylinder 6, as long as pressure exists in the pressure chamber 10.

The casing 4 is composed of individual axially joined pot shaped casing portions 4'. Each casing portion 4' has a recess 11 located eccentric with respect to the output shaft 3. The eccentric recess 11 serves as bearing surface for an idler gear 12 having a Z-shaped cross section. Internal teeth 13 of the gear 12 mesh with the teeth of the shoulder 8. Gear 12, therefore, rotates in the bearing surface 11 in response to the rotation of clutch cylinder 6. External teeth 14 of the idler gear 12 mesh with an internal gear 15 provided on a collar like projection 17 of an adjacent clutch cylinder 16 constructed in identical manner to clutch cylinder 6. Thus a gear connection between adjacent clutch cylinders 6 and 16 is established by the idler gear 12 mounted in the recess 11 of the casing portion 4', so that the clutch cylinder 16 continuously rotates with the clutch cylinder 6 though at a reduced speed. By directing the pressure into the pressure chambers 10' of the clutch cylinder 16, the latter may be engaged with the associated clutch friction disc 9, so that the output shaft 3 then rotates at the reduced speed of the second clutch cylinder 16.

By idler gears 12' of the arrangement described, a third clutch cylinder may be drivingly connected to the clutch cylinder 16, and a fourth clutch cylinder may again be connected therewith and so on, the next following clutch cylinder always rotating continuously at a speed reduced with respect to that of the preceding one. In FIGURE 1, five clutch cylinders of this type are shown, the uppermost clutch cylinder 16′ having the lowest, the lowermost one having the highest speed of rotation. Anyone of these clutch cylinders may be coupled with the output shaft 3 so that the output speed is variable step-by-step. It is assumed, however, that the only pressure chamber 10, 10′ of a single clutch cylinder is actuated at a time by fluid under pressure.

In order to be able to direct the fluid under pressure to the pressure chambers 10, 10′ of the individual clutch cylinders 6, 16 . . . 16′, a separate axially extending fluid passage 18, 18′ . . . is provided in the output shaft for each pressure chamber 10, 10′, . . . Each one of these fluid passages 18, 18′ opens into another pressure chamber 10, 10′, on one side, and into an annular groove 19, 19′, on the other side. A corresponding number of connection passages 20, 20′ is provided in the cover part 5, each one of which opens into one of the annular grooves 19, 19′.

Figure 3:
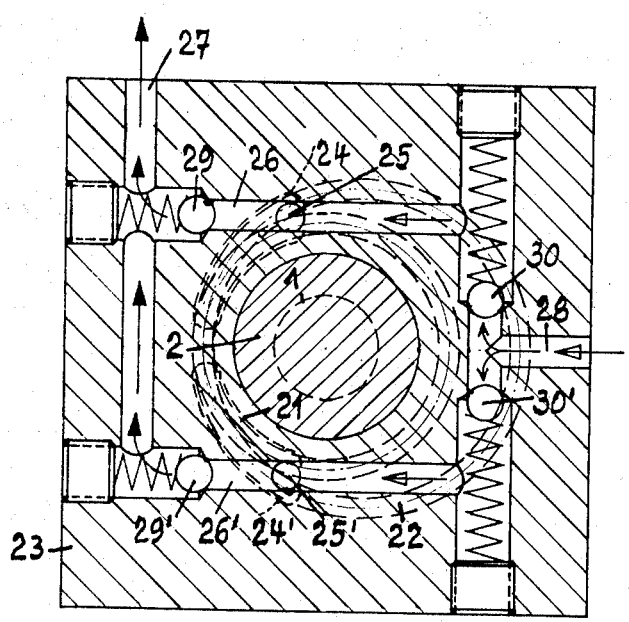
FIGURE 3 is a sectional view taken along line III—III of FIGURE 1.

A gear 21 is affixed to the head 2 of the input shaft and engages an internally toother gear 22, forming therewith a gear pump to produce the pressure required for the controls of the transmission. The gear pump 21/22 runs in a block shaped pump casing 23 enclosing the head 2 and the bearing for the input shaft 1, and provided with a bearing surface 23′ for the internally toothed pump gear 22. The surface of the pump casing 23 abutting the gears 21, 22 has kidney-shaped recesses 24, 24′. Passages 25 and 25′, respectively, open into one recess each (see FIGURE 3). Each one of the passages 25, 25′ communicates with a transverse passage 26 and 26′, respectively, which passages are both connected, on one side, to a pressure pipe connection 27 and, on the other side, to a suction pipe connection 28. A check valve 29 and 29′, respectively, is provided between each one of the transverse passages 26, 26′ and the pressure pipe. Furthermore, a check valve 30 and 30′ respectively is located between each transverse passage 26, 26′ and the suction pipe 28. If the input shaft 1 and the pump gears 21, 22 are driven clockwise, pressure is created in the recess 24′. The fluid is sucked-in from the suction pipe 28 through check valve 30 and transverse passage 26 and is delivered by the gear pump 21/22 through the passages 25′, 26′ and the check valve 29′ into the pressure pipe 27. Upon reversal of the direction of drive, the pump pressure is created in the recess 24 so that the fluid is sucked-in through check valve 30′ and is delivered also into the pressure pipe 24 through the check valve 29.

Figure 4:
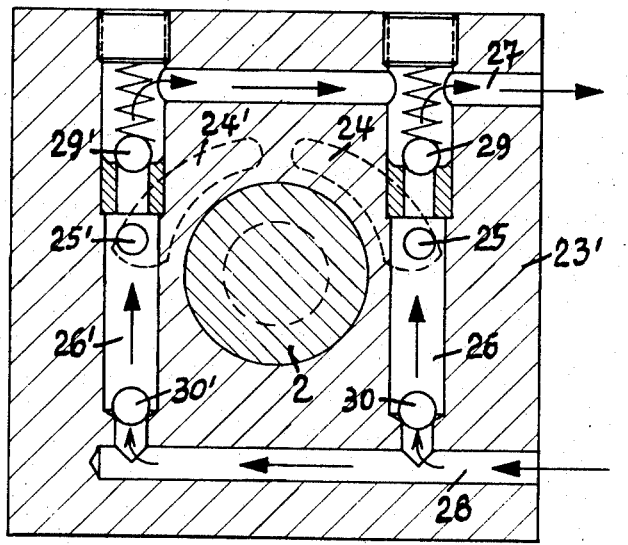
FIGURE 4 shows a sectional view taken along line III—III of FIGURE 1 and showing an embodiment slightly modified with respect to the pump passages.
Figure 7:
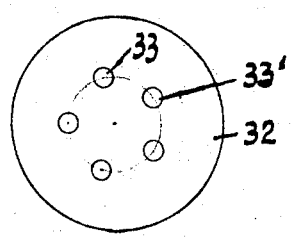
FIGURE 7 is a view from below of the pressure distributor.
Figure 5:
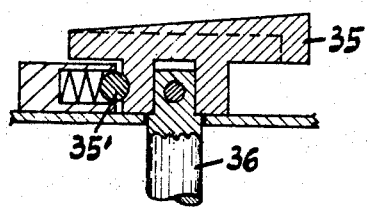
FIGURE 5 is a sectional view of a pressure distributor.
Figure 8:
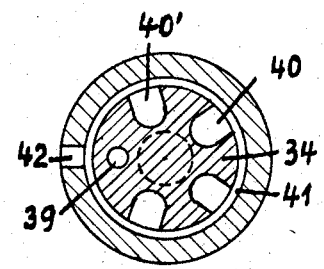
FIGURE 8 is a sectional view along line VIII—VIII of FIGURE 5.
Figure 9:
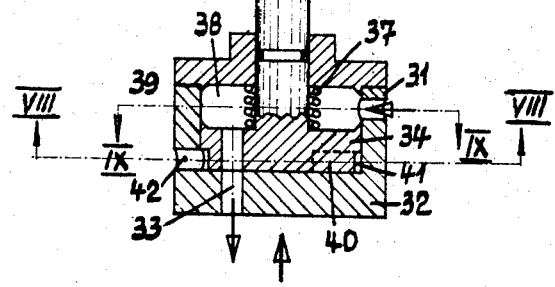
FIGURE 9 is a sectional view along line IX—IX of FIGURE 5.
Figure 6:
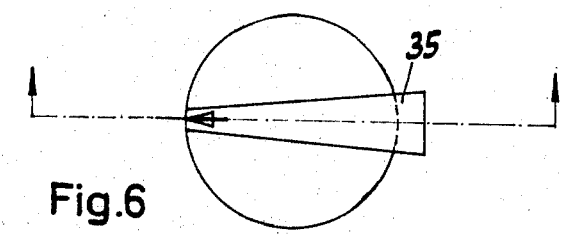
FIGURE 6 is a view from above.

A slightly different modification of the pump casing 23′ is shown in FIGURE 4, the pressure pipe 27 and the suction pipe being parallel to each other. This results in a simplification with respect to manufacturing.

Thus, as a result of the cooperation of the check valves 29, 30′ and 29′, 30, the pressure is created in the pressure pipe 27, at both directions of rotation of the gear pump. Therefore the input shaft 1 may be driven in both directions by the reversible motor, and the variable speed transmission may be used alternately in both directions of rotation, as required from washing machine drives. The pressure created in the pressure pipe 27 is supplied through connection bore 31, to pressure distributor shown in FIGURES 5 through 9. This distributor has a casing 32 with five ports 33, 33′ located on a circle in the bottom portion thereof. Each port 33, 33′ is connected with one of the connecting passages 20, 20′ in the cover part 5, through connecting conduits (not shown). A rotary slide valve body 34 rests on the bottom of the distributor casing 32, and can be rotated manually by means of a shaft 36 provided with a handle 35. The rotary slide valve body 34 is sealingly pressed on the bottom of the distributor casing 32 by a spring 37 and by the pressure build-up in a pressure chamber 38. The rotary slide valve body 34 has an eccentric axial bore 39 which can be located in alignment with one of the ports 33, 33′ at a time, so that the pressure from the pressure chamber 38 can be admitted to anyone of the connecting passages 20, 20′ and the associated pressure chambers 10, 10′ of a clutch cylinder 6, 16, 16′. The remaining ports 33′ communicate with atmosphere through recesses 40, 40′ of the rotary slide valve body 34 and through an annular passage 41 left free thereby and a vent 42.

Thus each one of the pressure chambers 10, 10′ may be exposed to the pressure produced by the gear pump 21, 22 and, at the same time, all other pressure chambers 10, 10′ may be relieved by connection to atmosphere, by setting the handle 35, which has a detent mechanism 35′. Therefore, each setting of the handle 35 corresponds to a different speed of the output shaft 3, while the direction of rotation of the output shaft depends on the direction of rotation of the input shaft 1 and the drive motor. Thus, in washing machine drives, an appropriate speed of rotation of the washing drum may be assigned to each washing program, and for example, a smaller value may be selected in the case of wool laundry than in the case of synthetic fiber laundry or normal laundry to be boiled. However, higher speeds of rotation for the centrifuging drive ratios of the machines may be set by means of the variable speed gear transmission.

Figure 10:
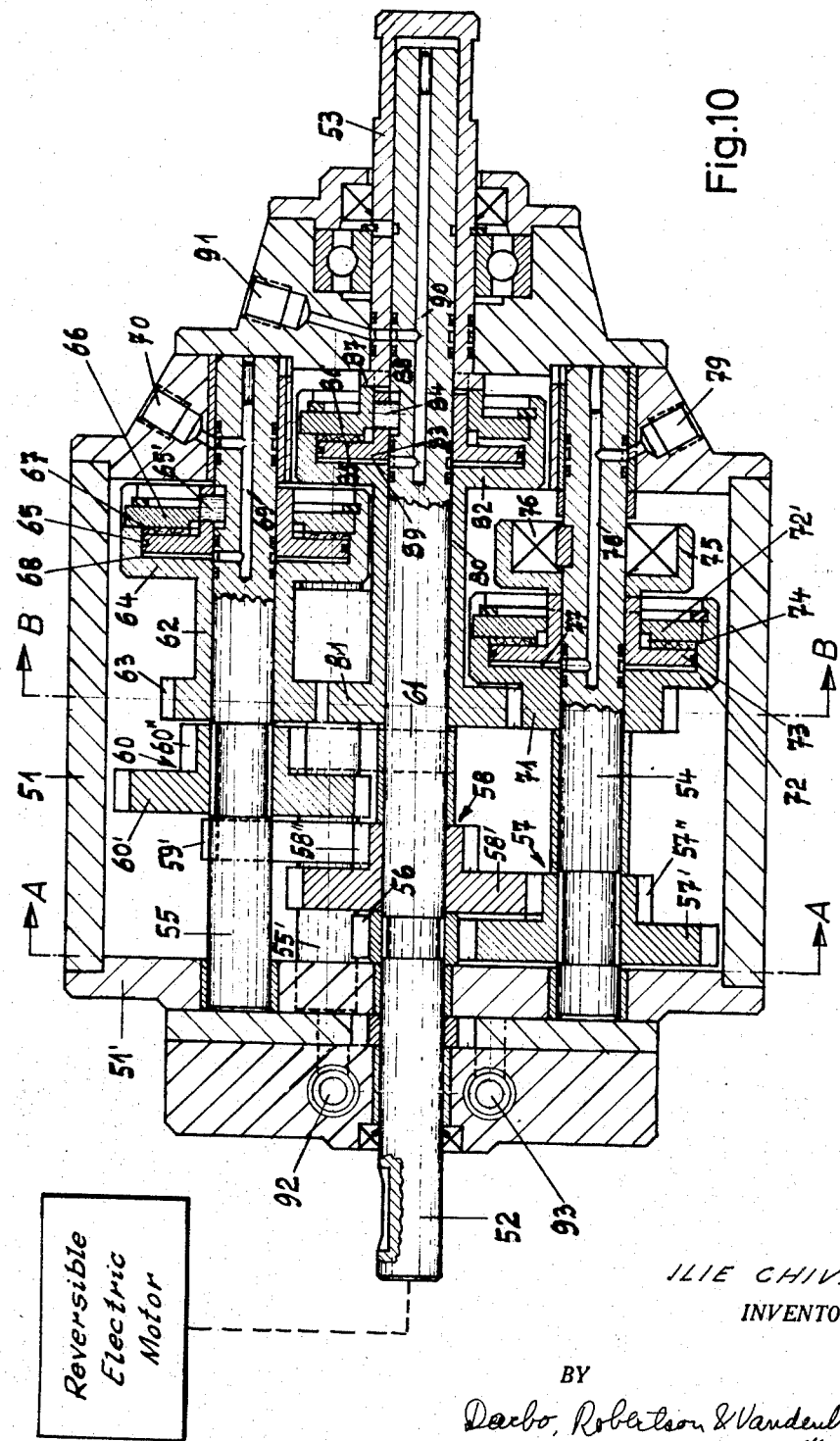
FIGURE 10 shows a longitudinal sectional view of a transmission having auxiliary shafts.
Figure 11:
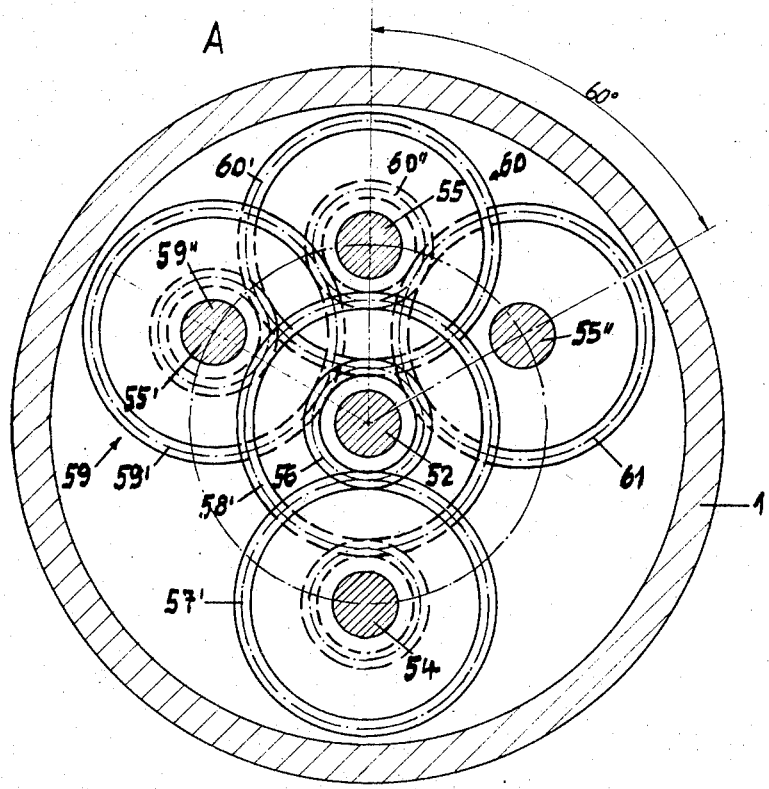
FIGURE 11 is a sectional view along line A—A of FIGURE 10.
Figure 12:
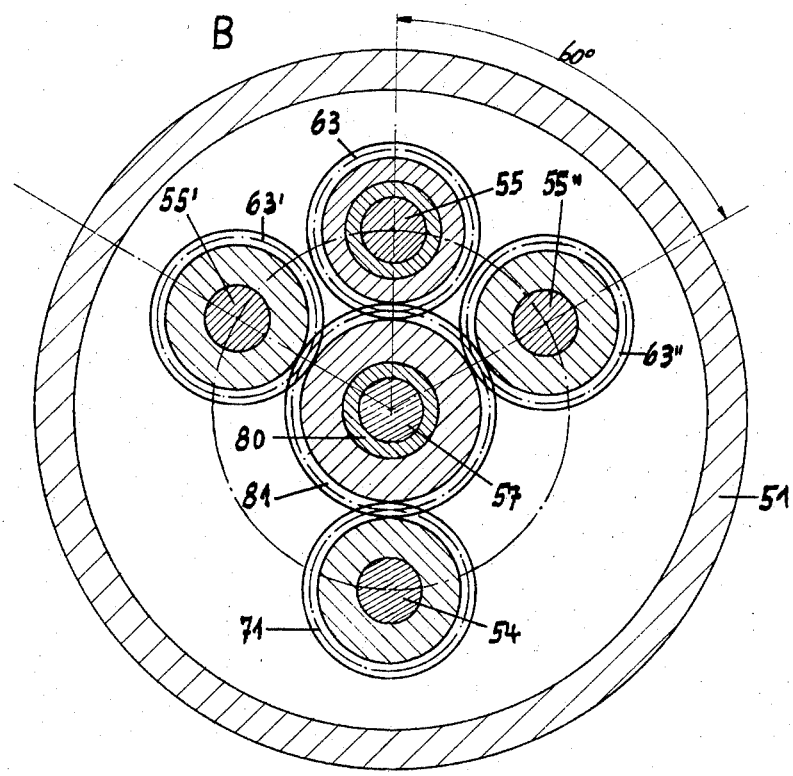
FIGURE 12 is a sectional view along line B—B of FIGURE 10.

In the embodiment shown in FIGURES 10 through 12, an input shaft 52 is mounted in a casing 51. Input shaft 52 is partly enclosed by an output shaft 53 formed as a hollow shaft. In addition, auxiliary shafts 54, 55, 55′, 55″ are mounted in the casing 51 and parallel to the input shaft 52. A pinion 56 is affixed to the input shaft 52. Pinion 56 meshes with a gear 57′ of a pair of gears 57 affixed to the auxiliary shaft 54. The smaller one, 57″ of the pair of gears 57 meshes with the larger one 58′ of a pair of gears 58 running loosely on the input shaft 52. The smaller gear 58″ of the pair of gears 58 meshes with the large gear 59′ of a pair of gears 59 fixed on the auxiliary shaft 55′. The small gear 59″ thereof meshes, in turn, with the large gear 60′ of a pair of gears 60 affixed to the auxiliary shaft 55. In the same manner, the small gear 60″ of the pair of gears 60 meshes with a gear 61 on the auxiliary shaft 55″. By the gear connections described, the auxiliary shafts 54, 55′, 55, 55″ get different, though step-by-step reduced speeds of rotation derived from the input shaft 52. The pairs of gears 57, 58, 59 and 60 are identical structural elements. This is made possible by arranging the auxiliary shafts 54, 55′, 55, 55″ on a common circle concentric with respect to the input shaft 52, and on the other hand, locating auxiliary shafts 55′, 55 and 55″ on this circle spaced 60° apart. In this arrangement, the distances of the auxiliary shafts 55′, 55 and 55″ from the input shaft 52 and the distances of the auxiliary shafts 55′, 55 and 55″ from each other become equal, so that identical pairs of gears 57 through 60 can be used.

A hub 62 runs on the auxiliary shaft 55 bearing a gear 63, at one end, and a clutch cylinder 64, at the other end. A friction disc 65 mounted on the auxiliary shaft 55 and non-rotatably connected therewith by a spline 65′ is housed in the clutch cylinder 64. At the front, the clutch cylinder 64 is closed by a cover part 66 secured against rotation and shifting. A lining 67 is provided between the friction disc 65 and the cover part 66, while a sealed pressure chamber 68 is provided between the clutch cylinder 64 and the friction disc. A fluid passage 69 extending from a fluid connection socket 70 mounted stationarily in the casing, and through the auxiliary shaft 55 opens into the pressure chamber 68. The same structure 62 through 70 provided on the auxiliary shaft 55, is provided in identical form also on the auxiliary shafts.

A gear 71 and a clutch cylinder 72 are mounted on the auxiliary shaft 54 and are rigidly connected with each other. A friction disc 73 is arranged within the clutch cylinder 72 and cooperates through a lining 74 with the cover part 72′ of the clutch cylinder 72. The friction disc is mounted loose on the auxiliary shaft 54 and is rigidly connected with a casing portion 75. The casing portion 75 is arranged to be coupled with the auxiliary shaft 54 through a one way drive device 76. A pressure chamber 77 located between the clutch cylinder 72 and the friction disc 73 is connected with a connection socket 79, stationary with respect to the casing through a fluid passage 78 extending through the auxiliary shaft 54.

A hub 80 is mounted on the input shaft 52 and carries a sun gear 81, at one side, and a clutch cylinder 82, at the other side. A friction disc 83 is located within this clutch cylinder and is non-rotatably connected with the input shaft 52 by a spline or key 84. Disc 83 cooperates with a cover part 86 through a lining 85. The cover part 86 is connected with the clutch cylinder and secured against rotation and axial shifting. With a spur gear 87, the cover part engages a corresponding spur gear 88 of the output shaft 53. Therefore the hub 80, the clutch cylinder 82, the cover part 86 thereof and the output shaft 53 form a rigid unit. A pressure chamber 89 between the clutch cylinder 82 and the friction disc 86 communicates with a connection socket 91 stationary with respect to the casing through a fluid passage 90 extending through the input shaft 52. This clutch 82 through 89 operative between the input shaft 52 and the output shaft 53 will be called "main clutch."

As shown in FIGURE 12, the gears 63, 63', 63" associated with the auxiliary shafts 55, 55', 55", respectively and gear 71 associated with auxiliary shaft 54 are engaged by gear 81 and form a "clutch gearing," through which all clutch cylinders 64, 72, and 82 are in drive connection with each other and get a speed of rotation depending on the speed of rotation of the input shaft 53. A gear pump housed in the cover part 51' of casing 51 is coupled with the input shaft 52 and is so designed, in the manner already described, that with all directions of rotation it delivers fluid under pressure into a pressure outlet and sucks-in fluid from an inlet connected to a sump. The mode of operation of the variable speed transmission described is as follows:

The input shaft 52 is driven by an electric motor (not shown), the direction of rotation of which is reversible. Thus the input shaft 52 and the auxiliary shafts 54, 55, 55', 55" rotate continuously at stepped speeds of rotation, largely different speeds of rotation being permitted by the pairs of gears 57, 58, 59, 60. Particularly important in this respect is the intermediate pair of gears 58 pivoted on the input shaft 52. At first, the output shaft 53 stands still. As soon as the pressure created by the gear pump is directed into one of the pressure chambers 68, 77 through a pressure distributor (not shown in FIGS. 10–12), the friction disc (65, 73) engages the associated clutch cylinder (64/72), which then assumes the speed of rotation of the associated auxiliary shaft (54, 55, 55', 55") and drives the hub 80 and thus the output shaft 53 through the clutch gearing 63/81 or 71/81, respectively. If the clutch (64, 65) of the slowest auxiliary shaft 55" is engaged in this manner, the output shaft 53 rotates at the lowest speed of rotation. It rotates at a correspondingly higher speed of rotation, if the clutch of the auxiliary shaft 55 or of the auxiliary shaft 55' is engaged, the direction of rotation of the output shaft 53 being reversed with reversal of the direction of drive.

If the clutch 72/73 of the auxiliary shaft 54 is engaged, rotation of the clutch cylinder 72 is effected only at one direction of rotation, namely that at which the free wheel 76 locks. By engagement of the main clutch 82/83, the input shaft may be coupled directly to the output shaft, so that the maximum output speed is achieved. The main clutch 82/83 may already be engaged while the clutch 72/73 of the auxiliary shaft 54 is still under pressure, whereby the speed of rotation of the clutch cylinder 72 becomes larger than that of the auxiliary shaft 54. This is made possible by the one way drive device 76 permitting overrunning. Thus from the second highest output speed achieved by actuation of the clutch 72/73 shifting to the maximum output speed by engagement of the main clutch 83/83 is possible without temporarily removing the drive torque.

The variable speed transmission described in the embodiment disclosed is determined for driving automatic washing machines. The auxiliary shafts 55", 55, 55' determine the output speed during the washing process, when the washing drum must be rotated back and forth. Three different speeds of rotation are available, for example a very low speed of rotation for wool laundry, a somewhat higher one for fine laundry and a still higher one for boiled and dirty laundry. A considerably higher speed of rotation will be achieved by the auxiliary shaft 54 during pre-centrifuging, when reversal of the direction of rotation is no longer required. By engagement of the main clutch 82/83, it is possible to shift at once from pre-centrifuging to the full centrifuging speed.

Of course, such a variable speed transmission can be designed also for other applications in analogous manner. By omission of the auxiliary shafts 55', 55", such a transmission may be made a three-ratio transmission, instead a five-ratio transmission. By the use of friction clutches of the type described, the inertial forces occurring during the shifting of the drive ratios can be neutralized by slipping off the clutch. During shifting to lower drive ratios (lower speeds) the friction clutch acts as a brake; during the shifting to higher drive ratios (increase of output speed), the inertia of the driven object is progressively overcome by slipping of the clutch.

Figure 13:
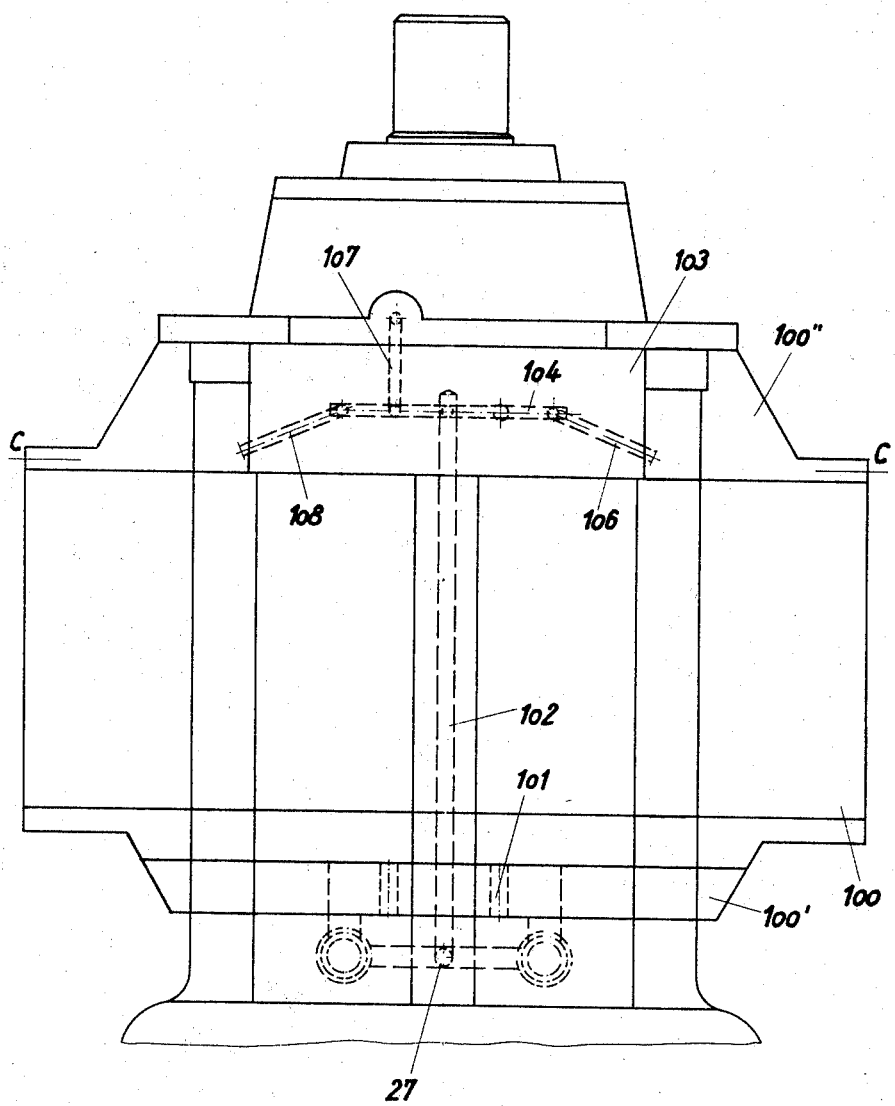
FIGURE 13 is a side elevational view of a three-step transmission with a diagrammatic illustration of the pressure fluid passages.
Figure 14:
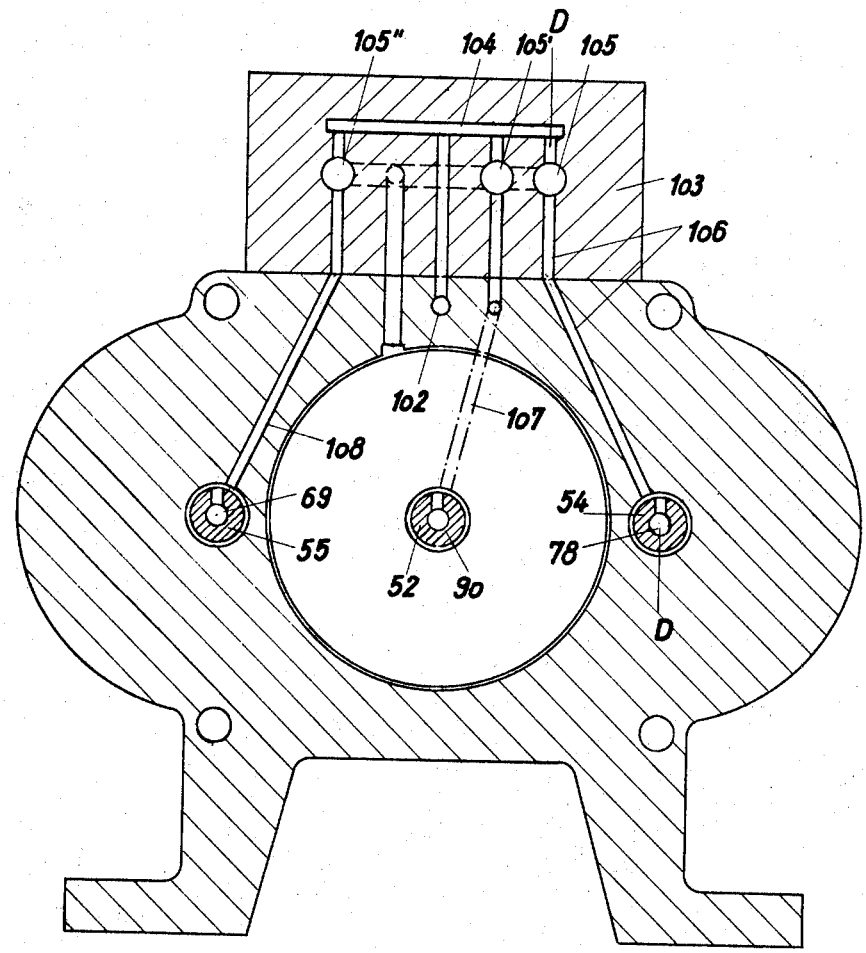
FIGURE 14 shows a sectional view along line C—C of FIGURE 13.
Figure 15:
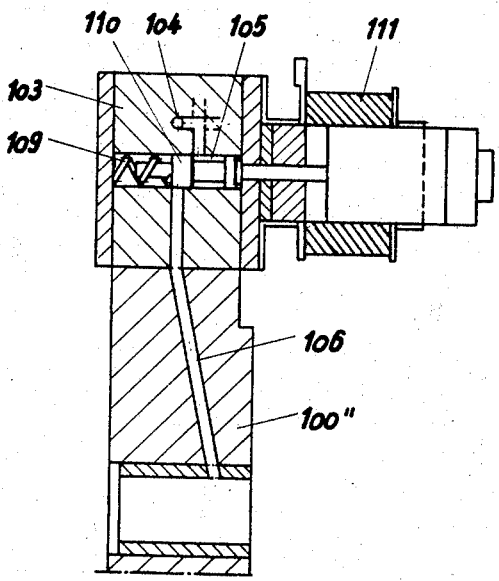
FIGURE 15 is a partial sectional view along line D—D of FIGURE 14.

As shown in FIGURES 13 through 15, the solenoid controlled pressure distributor required for the actuation of the clutches can be incorporated in the casing of such a variable speed transmission.

As previously described, a gear pump 101 is built in as a pressure generator in a cover part 100' of the casing 100. The pressure outlet pipe of the gear pump 101, designated 27 in FIGURES 3, 4 and 13, communicates with a passage 102 extending through the wall of the casing 100, or through a rib formed on the wall of the casing, and to a pressure distributor 103. The block shaped pressure distributor 103 is mounted on a further cover part 100". The passage 102 continues in the pressure distributor 103 as a T-shaped passage, to which three control cylinders 105, 105', 105" are connected. A passage 106 extending partially through the pressure distributor, partially through the wall of the cover part, opens into the control cylinder 105 and communicates with the passage 78 in the auxiliary shaft 54 (see FIGURE 10). A similar casing passage 107 opening into the control cylinder 105' communicates with the passage 90 of the input shaft 52. A third casing passage 108 opening into control cylinder 105" leads to the passage 69 of the auxiliary shaft 55.

Slide valve 110 under the force of a spring 109 is slidable in each one of the control cylinders 105, 105', 105" and governs the connection between the pressure pipe 104 and the passages 106 or 107 or 108, respectively. In the arrangement described of the pressure distributor 103 and the passages 102, 104, 106 through 108, any pressure pipes located outside the casing and their screw joints are omitted. The desired drive ratio of the transmission can be set through the solenoids 111, for example from a programmer shaft.

The invention is claimed as follows:

1. In a multiple speed transmission having a frame within which is an input shaft rotating at a given speed, an output shaft rotatable at a step-by-step plurality of speeds which are functions of the speed of the input shaft, and a plurality of clutches each being engageable to establish one of said output speeds, each of said clutches having an input half and an output half, the improvement comprising:

said shafts being coaxially mounted in said frame for rotation with respect thereto, means connecting the input half of one clutch to the input shaft, means connecting the output half of the one clutch to the output shaft, first gearing means having an input gear and an output gear, the input gear being connected to the input shaft and the output gear being connected to an input half of a second of said clutches, means connecting the output half of the second clutch to the output shaft, second gearing means having an input gear and an output gear, the input gear of the second gearing means being fixedly connected to the output gear of the first gearing means, the output gear of the second gearing means being connected to the input half of a third of said clutches, means connecting the output half of the third clutch with said output shaft, third gearing means having an input gear and an output gear, the input gear of the third gearing means being fixedly connected to the output gear of the second gearing means, the output gear of the third gearing means being connected to the input half of a fourth of said clutches, and means connecting the output half of the fourth clutch with said output shaft.

2. In a multiple speed transmission as set forth in claim 1, wherein said clutches include a cylinder with a piston movable therein to cause frictional engagement of the clutch halves, each clutch being mounted on a shaft, the shaft upon which a clutch is mounted having a fluid passageway communicating with the cylinder of the clutch and the clutch being engaged by the application of fluid pressure to the passageway.

3. In a multiple speed transmission as set forth in claim 2, wherein a reversible motor is connected to said input shaft, said transmission including fluid pump means connected to the input shaft to be driven thereby and to supply fluid to an outlet with either direction of rotation of said input shaft, valve means connected to said outlet to receive fluid under pressure from the pump means, and to said passageways to deliver fluid to the clutches, said valve means being operable to selectively deliver fluid to only one passageway at a time.

4. In a multiple speed transmission as set forth in claim 2, wherein said clutch halves are all coaxial with said input and output shafts with one half of each forming the respective clutch cylinder, said gearing means comprising a geared shoulder on one side of said one clutch half and an internal gear on the other side thereof, an idler gear eccentric to said axis between two clutch cylinders and meshing with the geared shoulder on one clutch and the internal gear on the adjacent clutch, and means mounting said idler gear for rotation eccentric to said axis.

5. In a multiple speed transmission as set forth in claim 2, including a first, a second and a third clutch shaft, each positioned parallel to said axis and at different angular positions about said axis, said first, second and third shafts being journaled in said frame, said first gearing means connecting the input shaft and the first shaft, said second gearing means connecting the first shaft and the second shaft, said third gearing means connecting the second shaft and the third shaft, said second clutch having its input half mounted on the first shaft, said third clutch having its input half mounted on the second shaft, said fourth clutch having its input half mounted on the third shaft.

6. In a multiple speed transmission as set forth in claim 5, wherein said first, second and third shafts are equidistant from said axis, the output halves of the second, third and fourth clutches being rotatable with respect to the first and second and third shafts respectively, said means connecting the output halves of the second, third and fourth clutches including: a sun gear rotatable about said axis and secured to the output shaft; a gear attached to the output half of the second clutch, rotatable about the first shaft and engaging said sun gear; a gear attached to the output half of the third clutch, rotatable about the second shaft and engaging said sun gear; and a gear attached to the output half of the fourth clutch, rotatable about the third shaft and engaging the sun gear.

7. In a multiple speed transmission as set forth in claim 6, including a one way drive means in the driving connection formed by the first gear means, the first shaft, the second clutch and the sun gear to permit the first gear means to drive the sun gear when the second clutch is engaged but not vice versa.

8. In a multiple speed transmission having a housing in which is journaled an input main shaft rotating at a given speed about an axis, an output main shaft journaled in the housing and positioned along an axis common to the axis of the input shaft and a variable speed mechanism connecting the input shaft and the output shaft to selectively drive the output shaft from the input shaft at a selected one of a plurality of fixed speeds each of which is a function of the given speed of the input shaft, said mechanism comprising:

three auxiliary shafts journaled in said housing, said auxiliary shafts being positioned parallel to said axis, at a common distance from said axis and at spaced angular positions about said axis;

first gearing means including an input gear and an output gear, one of said gears being attached to one of the main shafts and the other gear being mounted on a first of the auxiliary shafts, said second gearing means rotating the other gear and said one main shaft at different speeds;

second gearing means having an input gear and an output gear, one of the gears of the second gearing means being attached to the other gear of the first gearing means, the other gear of the second gearing means being mounted on a second of the auxiliary shafts, said second gearing means rotating said other gears of the first and second gearing means at different speeds;

third gearing means having an input gear and an output gear, one of said gears of the third gearing means being attached to said other gear of the second gearing means, said other gear of the second gearing means being mounted on the third of the auxiliary shafts, said third gearing means rotating said other gears of the second and third gearing means at different speeds;

first clutch means mounted on said first shaft and having two halves, one half being connected to the other gear of the first gearing means;

second clutch means mounted on said second shaft and having two halves, one half of the second clutch means being connected to the other gears of the second gearing means;

third clutch means mounted on said third shaft and having two halves, one half of the third clutch means being connected to the other gear of the third gearing means;

a sun gear attached to the other main shaft;

a gear mounted on said first shaft, engaging the sun gear and connected to the other half of the first clutch means;

a gear mounted on said second shaft, engaging the sun gear and connected to the other half of the second clutch means; and a gear mounted on said third shaft, engaging the sun gear and connected to the other half of the third clutch means;

whereby when the input shaft is driven and the first clutch means only is engaged the output shaft will be driven at one speed, when the second clutch means only is engaged the output shaft will be driven at another speed, and when the third clutch means only is engaged the output shaft will be driven at still another speed.

9. In a multiple speed transmission as set forth in claim 8, wherein the other gear of the first gearing means and the one gear of the second gearing means are unitary, and the other gear of the second gearing means and the one gear of the third gearing means are unitary.

10. In a multiple speed transmission as set forth in claim 9, wherein said other gears of the first, second and third gearing means are attached respectively to said first second and third shafts, said one half of the first, second and third clutches are attached respectively to said first, second and third shafts, and the other halves of the clutches with their respectively connected gears are journaled on the respective shafts.

11. In a multiple speed transmission as set forth in claim 10, including a fourth clutch positioned coaxially to said main shafts and having one half thereof attached to the input shaft and the other half thereof attached to the output shaft.

12. In a multiple speed transmission as set forth in claim 8, including a fourth clutch positioned coaxially to said main shafts and having one half thereof attached to the input shaft and the other half thereof attached to the output shaft.

13. In a multiple speed transmission as set forth in claim 8, wherein a reversible motor is connected to said input shaft, said transmission including fluid pump means connected to the input shaft to be driven thereby and to supply fluid to an outlet with either direction of rotation of said input shaft, valve means connected to said outlet to receive fluid under pressure from the pump means, and to said passageways to deliver fluid to the clutches, said valve means being operable to selectively deliver fluid to only one passageway at a time.

References Cited

UNITED STATES PATENTS

| | | | |
|---|---|---|---|
| 2,197,515 | 4/1940 | Wert | 74—332 |
| 2,938,398 | 5/1960 | Denarest | 74—332 |
| 3,138,965 | 6/1964 | Brey et al. | 74—331 |
| 3,175,411 | 3/1965 | McFarland | 74—330 |
| 3,285,100 | 11/1966 | Peltner | 74—331 |

DONLEY J. STOCKING, *Primary Examiner.*

HENRY S. LAYTON, *Assistant Examiner.*

U.S. Cl. X.R.

74—331, 332